United States Patent [19]

Beccaris et al.

[11] Patent Number: 4,903,804
[45] Date of Patent: Feb. 27, 1990

[54] CLUTCH, PARTICULARLY FOR AN AUTOMOTIVE VEHICLE

[75] Inventors: Carlo Beccaris, Santena; Massimo Rubatto, Turin, both of Italy

[73] Assignee: Valeo, Paris, France

[21] Appl. No.: 329,311

[22] Filed: Mar. 27, 1989

[30] Foreign Application Priority Data

Mar. 30, 1988 [FR] France ............................. 88 04172

[51] Int. Cl.⁴ .......................... F16D 7/02; F16D 43/20
[52] U.S. Cl. ...................................... 192/56 F; 192/52
[58] Field of Search ................................ 192/52, 56 F

[56] References Cited

U.S. PATENT DOCUMENTS

| 2,642,971 | 6/1953 | Hagenbook | 192/56 F |
| 2,963,134 | 12/1960 | Banner | 192/56 F |
| 3,251,247 | 5/1966 | Lamburn | 74/751 |
| 3,511,349 | 5/1970 | Herscovici | 464/36 |
| 3,807,539 | 4/1974 | Reed | 192/56 F |
| 4,081,063 | 3/1978 | Malmros et al. | 192/56 F |

FOREIGN PATENT DOCUMENTS

| 0182312 | 5/1986 | European Pat. Off. . |
| 1600183 | 11/1970 | Fed. Rep. of Germany . |
| 3630974 | 4/1987 | Fed. Rep. of Germany . |
| 2323918 | 4/1977 | France . |
| 2523743 | 9/1983 | France . |
| 2616501 | 12/1988 | France . |
| 56-55723 | 5/1981 | Japan ...................... 192/56 F |
| 2082697 | 3/1982 | United Kingdom . |

Primary Examiner—Rodney H. Bonck
Assistant Examiner—Nicholas Whitelaw
Attorney, Agent, or Firm—Charles E. Brown; Charles A. Brown

[57] ABSTRACT

A clutch comprises two coaxial clutch parts. One clutch part includes a pressure plate and a reaction plate coupled with a first shaft for rotation therewith. The other clutch part includes at least one friction disc coupled with a second shaft for rotation therewith. The pressure plate is subjected to the action of a control mechanism arranged to urge it towards or away from the reaction plate. A torque limiter is coupled with one or other of the shafts for rotation with it. The torque limiter is also coupled for rotation with one of the two clutch parts so as to rotate with that clutch part. The torque limiter is mounted within its own housing, which is disposed outside the space defined between the pressure plate and reaction plate of the clutch. The torque limiter housing is secured to a fixed support, typically the clutch casing itself, and includes a detector for detecting longitudinal forces exerted by the torque limiter. The detector is connected with a monitoring unit for monitoring the control pressure exerted by the control mechanism of the clutch on the pressure plate.

7 Claims, 9 Drawing Sheets

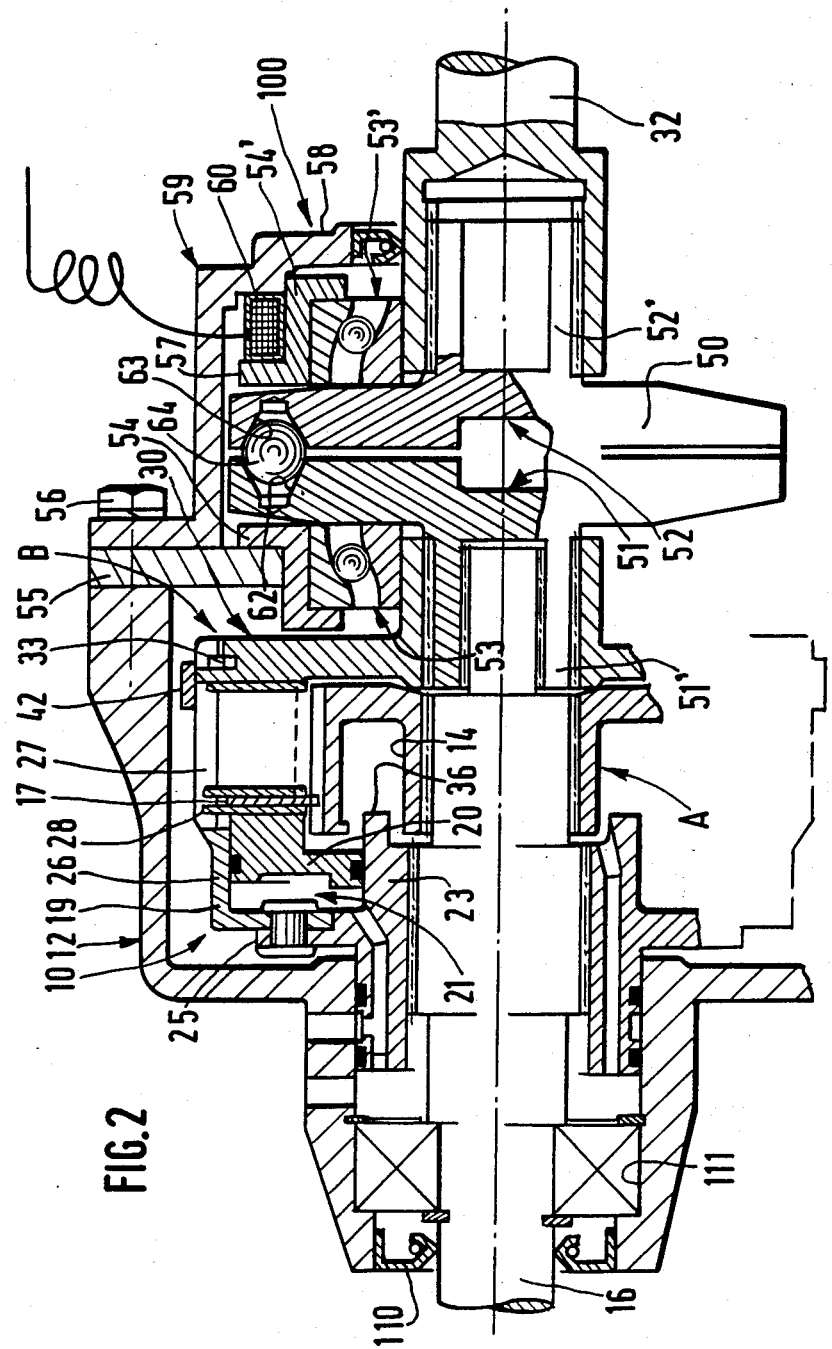

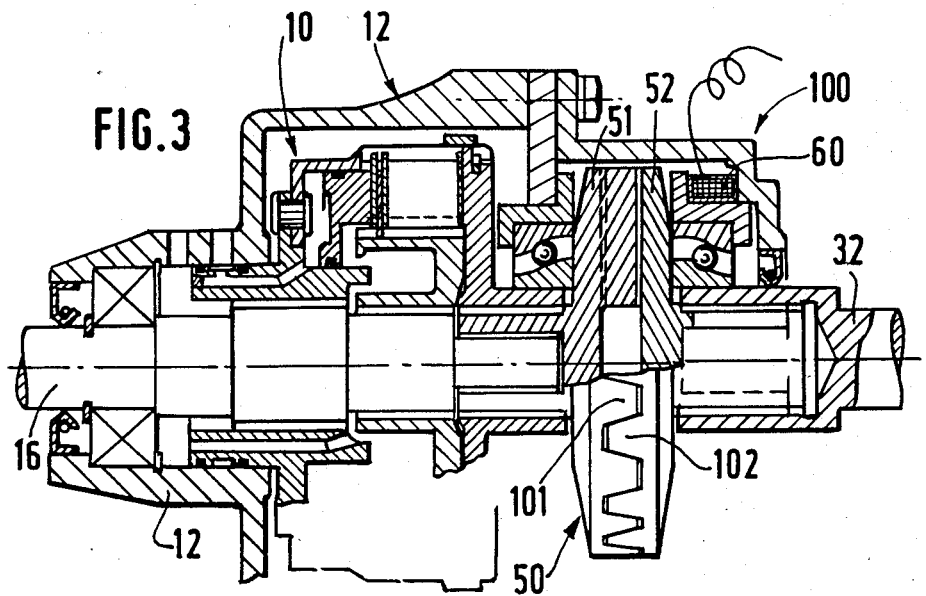
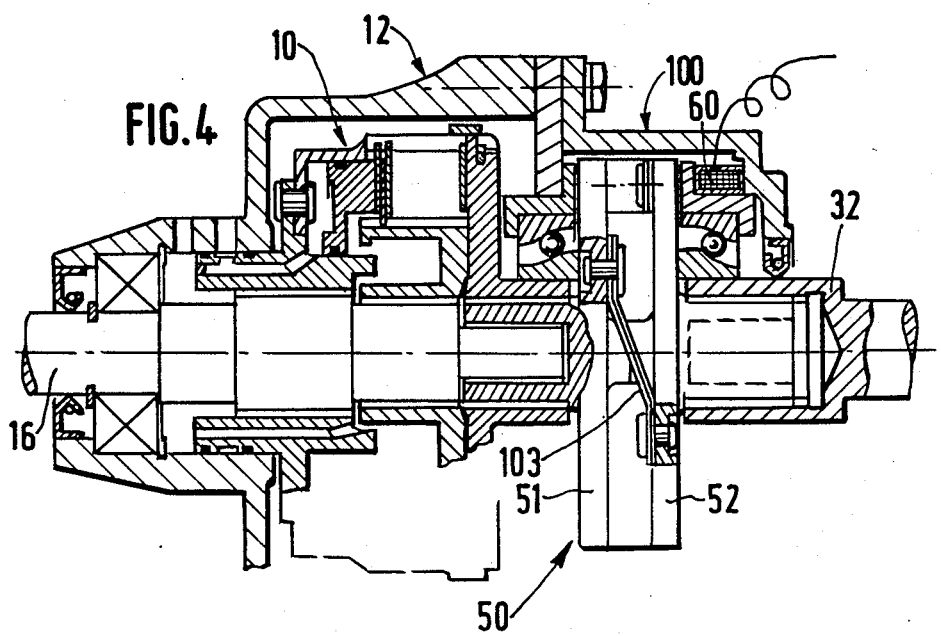

CLUTCH, PARTICULARLY FOR AN AUTOMOTIVE VEHICLE

FIELD OF THE INVENTION

This invention relates to clutches, particularly for automotive vehicles.

BACKGROUND OF THE INVENTION

An automotive clutch generally comprises two coaxial clutch parts, one of which has at least one annular friction disc, i.e. a single friction disc or a plurality of friction discs axially spaced from each other, the other clutch part including a pressure plate which acts as a coupling member to couple the two clutch parts together when the clutch is engaged, and the other clutch part also including a reaction plate, for axial gripping engagement of the friction disc or discs between the plates. The pressure plate is under the control of a control means adapted to urge it in a direction towards or away from the reaction plate.

One of the clutch parts is coupled with a driving shaft for rotation therewith, while the other clutch part is coupled with a driven shaft, also for rotation therewith. The axial coupling of the friction disc or discs, when the clutch is engaged, brings the two clutch parts together in common rotation.

The control means may be of a hydraulic type, for example as described in the published patent document No. 1,600,183 of the Federal Republic of Germany. That document describes a control means in which the clutch includes two members cooperating with each other, one being a cylinder member and the other a piston member, these two members together defining a variable volume pressure chamber, with one of these members being movable with respect to the other. This movable member of the piston and cylinder assembly acts as the pressure plate of the clutch.

In another arrangement, the control means may comprise axially acting resilient means such as a diaphragm. Such an arrangement is described in French published patent application No. 2,616,501, in which the diaphragm is arranged to act in combination with monitoring means sensitive to the torque transmitted by the clutch, and with actuating means arranged to act on a declutching member in response to signals from the monitoring means. The declutching member is arranged to move the resilient means in such a way as to modify the coupling pressure on the pressure plate. In such a clutch, the transmitted torque depends on the control pressure exerted by the pressure plate and on the friction involved, in particular the coefficient of friction of the friction disc or discs and that obtaining within the clutch generally, this being influenced by the sliding action of the friction disc or discs.

In addition, the coefficient of friction is itself variable, especially as a function of speed. It is also influenced by the lubricating fluid when the disc or discs are lubricated by a fluid as described in the above mentioned West German patent document No. 1,600,183.

That document also discloses a torque limiter, of a kind comprising two parts defining a gap by which the two parts are spaced from each other. The two parts of the torque limiter are connected with each other through spacing means, the spacing between the two parts being variable as a function of torque. The torque limiter is coupled with the driving shaft for rotation therewith, and acts on the piston and cylinder assembly through an intermediate member so as to modify the pressure in the control chamber.

However, in order to avoid having to provide this intermediate member, it is possible to arrange the torque limiter so that it acts directly on the piston member of the clutch. Such an arrangement is described in U.S. Pat. No. 3,511,349.

In the above mentioned prior art documents, an object of the arrangements described is to limit the torque to a range of values about a predetermined datum value, without seeking modulation of the control pressure as a function of the requirement of the driven shaft. In addition, in all of this prior art, the torque limiter, where provided, is integrated with the clutch, being disposed within the space delimited between the reaction plate and the pressure plate. This makes it necessary to modify the general construction of the clutch itself.

SUMMARY OF THE INVENTION

An object of the present invention is to overcome the above mentioned disadvantages, and accordingly to provide an economic arrangement in which the control pressure can be modulated as a function of the requirements of the driven shaft, while still preserving the form of construction of a conventional clutch.

According to the invention, there is provided a clutch, particularly for an automotive vehicle, of the kind generally comprising a first clutch part coupled with a first shaft for rotation therewith and a second clutch part coupled with a second shaft for rotation therewith, an annular friction disc or a plurality of annular friction discs spaced apart axially, friction disc or discs being mounted around the first clutch part, the second clutch part comprising a pressure plate and a reaction plate for axially gripping the friction disc or discs between them, control means associated with the pressure plate and adapted to act thereon so as to urge it towards the reaction plate. The clutch further comprises a cam mechanism adapted for variable expansion in response to variation in the transmitted torque. The cam mechanism comprises two parts defining a gap between them, spacing means coupling the parts of the cam mechanism to each other. The cam mechanism is coupled to one of the first and second shafts for rotation therewith, the clutch being further characterised by a cam mechanism housing disposed outside the space defined between the pressure plate and the reaction plate. Means couples the cam mechanism to one of the clutch parts for rotation therewith, and means mounting the cam mechanism in housing. The clutch further comprises a fixed support means and means securing the cam mechanism housing to the fixed support means. The housing carries a detector for detecting longitudinally acting forces associated with the cam mechanism, and a monitoring unit to which the detector is connected for monitoring the control pressure exerted by the control means on the pressure plate.

The tendency of the cam mechanism to expand is, by use of this invention, caused to vary in response to the demands imposed by the driven shaft and, due to the provision of the detector means. This allows the control pressure, and thus the amount of torque which it is necessary to transmit to the driven shaft, to be monitored.

It will be appreciated that the structure of a multi-disc clutch itself can be used without the clutch being itself modified, and that the arrangement according to the invention is a particularly economic one. This is due particularly to the use of a detector for longitudinal force. Such a detector is simpler to apply than in the case of prior art detectors of rotary forces. In addition, response times with a clutch according to the invention are short.

Furthermore, torque variation is accompanied by high accuracy in sensing the forces imposed by the cam mechanism.

The cam mechanism housing constitutes a means for restraining the cam mechanism itself, so as actually to prevent any variation in the thickness, i.e. axial length, of the latter. As a result, variations in torque are converted into stresses imposed on the detector means, with the high accuracy mentioned above.

In order to minimise the longitudinal forces arising particularly from the driving and driven shafts, the torque limiter may be mounted within a housing which is resiliently suspended with respect to the clutch casing. Also, parasitic forces can be minimised by using two detectors arranged on either side of the torque limiter.

The invention is explained more fully in the description which follows, and which is given with reference to the accompanying drawings.

BRIEF DESCRIPTION OF THE DRAWINGS

FIG. 2 is a simplified view repeating parts of FIG. 1.

FIGS. 3 to 7 are views similar to FIG. 2, each showing another embodiment of the invention.

DESCRIPTION OF THE PREFERRED EMBODIMENTS

Figure 1:
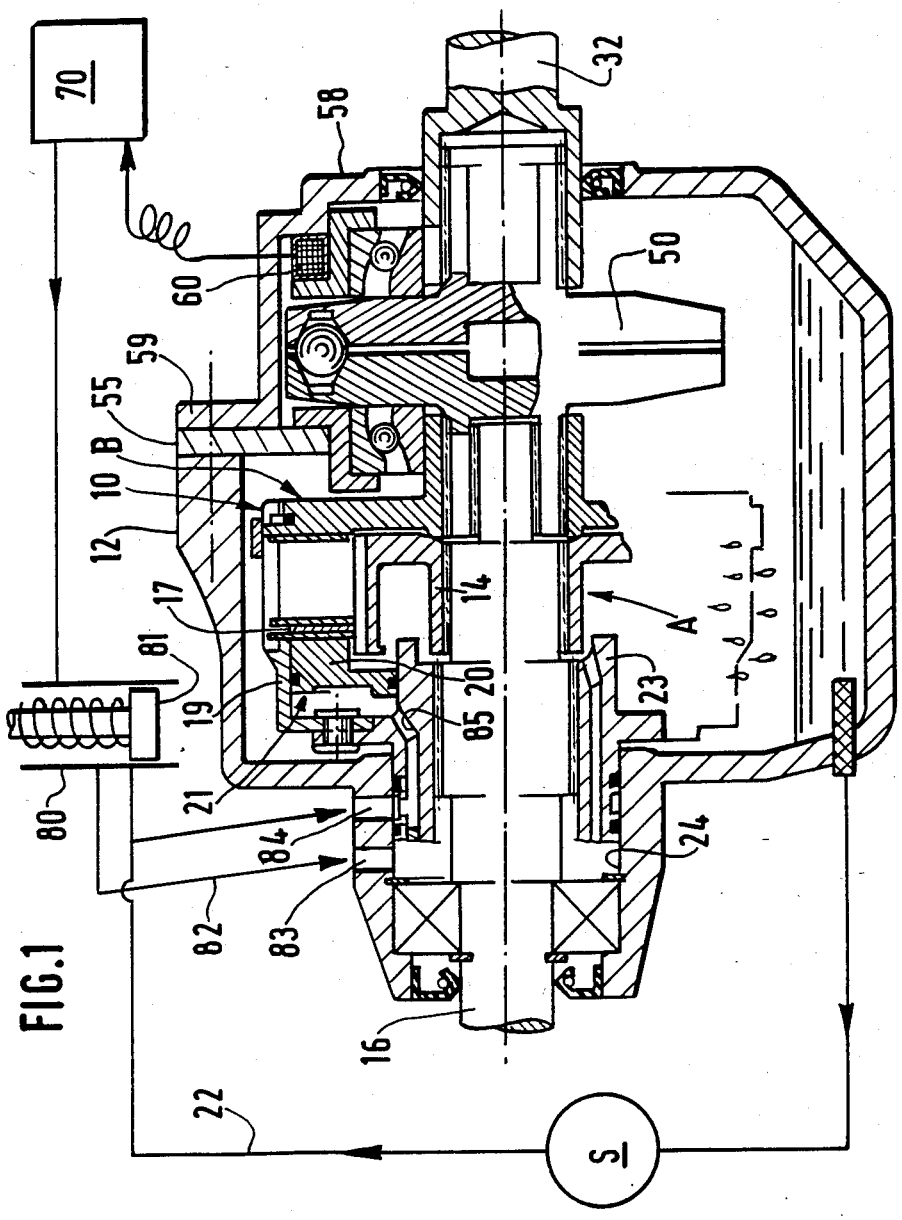
FIG. 1 is a partial view in axial cross section of a clutch according to the invention.

In the various embodiments shown in the drawings, a clutch, generally indicated at 10, for an automotive vehicle has a fixed support member comprising a clutch casing 12.

The clutch 10 comprises two coaxial clutch parts A and B, one of which is the driving part and the other the driven part. The clutch part A comprises a hub 14, having a splined bore by which it is mounted on a first shaft for rotation with the latter. In this example, this first shaft is a driving or input shaft 16, for example the output shaft of the engine of the vehicle. The clutch part A also comprises at least one friction disc 17 which is slidingly mounted on the hub 14 and coupled with the latter, for rotation therewith, through a splined connection.

In this description there are several friction discs 17, which are axially movable and which are spaced apart axially along the hub 14. In the interests of clarity, not all of these friction discs are shown.

The driven clutch part B includes two members 19 and 20 in the form of a cylinder and a piston respectively, with the piston 20 slidable in the cylinder 19. The members 19 and 20 together define a chamber 21 of variable volume, disposed to a first side of the friction discs, considered in the axial direction. The variable volume chamber 21 is arranged to be connected through a duct 22 with a source S of fluid under pressure, for example a pump. The piston 20 is axially movable. The cylinder 19 on the other hand is axially fixed, and includes a hub portion 23 by which it is rotatably mounted in the bore 24 of the clutch casing 12. It also has a cylindrical skirt portion 26 (FIG. 2) surrounding the friction discs 17 and connected to the hub 23 by means of a transverse wall portion or base 25.

Longitudinal grooves 27 are formed in the skirt portion 26. Arranged alternately with the friction discs 17, there is a set of plates 28 engaging in the grooves 27 so as to be rotatable with the cylinder 19.

The open end of the skirt portion 26 is closed by a reaction plate 30, which is itself constrained to rotate with the skirt portion 26 by engaging in the grooves 27. The reaction plate 30 has an L-shaped transverse cross section, one arm of the L extending axially and having a splined bore. The plate 30 is coupled to a second shaft for rotation herewith, in a manner to be described below. This second shaft is here a driven or output shaft 32, such as a power take-off shaft.

The reaction plate 30 is mounted in an axial relationship with the skirt portion 26 by means of an open securing ring 33, which engages both in a ring of the skirt portion 26 and in a groove formed in the reaction plate 30. An outer closing ring 42 is mounted around the skirt portion 26, in line with the ring 33, so as to prevent the skirt portion opening up and in order to complete the mounting.

The piston 20 is slidingly and sealingly engaged between the skirt portion 26 and an axial extension 36 of the hub portion 23. For sealing, joints 110 are provided, and the shaft 16 is supported by a rolling bearing 111. The piston 20 acts as a thrust member and as a pressure plate for applying a thrust to the friction disc or discs 17 between the latter and the reaction plate 30.

The piston 20, cylinder 19 and pressure chamber 21 constitute control means for biassing the pressure plate 20 towards the reaction plate 30.

In accordance with the invention, a cam mechanism 50, with a facility for measuring torque, is coupled with one of the coaxial clutch parts A, B for rotation therewith. There is a spacing between two halves of the cam mechanism 50, which is variable as a function of the torque. The cam mechanism is mounted in a cam mechanism housing 100, which is arranged outside the space defined between the reaction plate 30 and the pressure plate 20. The housing 100 is secured to the fixed support (casing) 12 of the clutch, and carries a longitudinal force detector 60 which is associated with the cam mechanism 50 itself. The detector 60 is connected to a monitoring unit 70 which monitors the control pressure exerted by the control means described above on the pressure plate or piston 20.

As can best be seen from FIG. 2, the two halves of the cam mechanism 50 comprise two parts 51 and 52 separated by a gap. The part 51 is coupled with the reaction plate 30 for rotation therewith, by means of a splined coupling, and has an axial extension portion 51' lying within a hollow annular projection, axially orientated, of the reaction plate 30. The extension portion 51' has splines of corresponding shape to those of the plate 30. An oblique contact ball bearing 53 is mounted on the axial extension of the reaction plate 30, and is radially interposed between the latter and a retaining member 54. The member 54 has a shoulder for the retention of the bearing 53 in the axial direction, and another shoulder for contact with a radially extending plate 55 secured at the end of the casing 12 by means of studs 56. The shoulders of the retaining member 54 are arranged at opposite ends of an axially extending sleeve portion of the member, and extend radially in opposite directions. The inner ring of the ball bearing 53 is axially offset from, and in engagement with, the cam mechanism part 51, while the retaining member 54 fits in the central opening of the plate 55, in which it is slidable. The cam mechanism 50 is thus coupled to the cylinder 19, for rotation therewith, while being located outside the clutch proper. The cam mechanism part 52 is constructed in a similar way to the part 51, having an axial extension 52' which is engaged in a blind bore formed in the end of the output shaft 32, to which it is splined so as to be rotatable with it.

An oblique contact ball bearing 53' is mounted on the extension 52', and is interposed between the latter and a retaining member 54' which acts as a carrying member for the force detector 60. The retaining member 54' is mounted facing the retaining member 54, with which it is identical, having one shoulder for retaining the bearing 53' and another shoulder 57 for retaining the detector 60. The detector 60 is trapped between the shoulder 57 and the base 58 of a cover portion 59. The cover portion 59 is generally in the shape of a hollow dish, open centrally to allow the driven shaft 32 to extend through it. It will be noted that the member 54' can be displaced axially with respect to the base 58, and that it is both centred and carried by the latter. Similarly, it will be observed that the inner ring of the bearing 53' is offset axially from, and in engagement with, the end face of the torque limiter part 52. The cover portion 59 is secured to the casing 12 by means of the studs 56, which extend through a radial flange of the cover portion 59, with this flange lying against the outer face of the plate 55. The studs 56 thus secure the various components 51 to 54, 53', 54', 60 and 64 between the transverse walls 55 and 58.

The cover portion 59 and the plate 55 together define the cam mechanism housing 100, and thus, by cooperation with the member 54 and the detector 60 associated with the member 54', they also act as retaining means which actually prevent any variation in the thickness or axial length of the cam mechanism 50. The housing 100 carries the detector 60 and encloses the cam mechanism 50. The above mentioned variation in the thickness of the cam mechanism is achieved using spacing means. Thus each of the two parts 51 and 52 of the cam mechanism has frusto conical recesses 62 and 63 respectively which are arranged facing each other. Balls 64 are mounted between the recesses 62 and 63. The balls 64 and the recesses 62 and 63 constitute the spacing means operatively connecting the two parts 51 and 52 together.

In operation of the cam mechanism, any difference in value between the torque transmitted by the clutch 10 and that transmitted through the shaft 32 results in a relative displacement of the part 51 with respect to the part 52. This causes a force to be exerted on the balls 64, which tend to force the parts 51 and 52 further apart, so that the cam mechanism 50 tries to expand axially. As mentioned above, however, this expansion is prevented by the housing 100. Consequently, a compressive force is exerted on the longitudinal force detector 60. The detector 60 may take the form of a strain gauge or pressure transducer.

The detector 60 transmits an electrical signal to the monitoring unit 70. The latter is an electronic module from which an appropriate electrical output signal is transmitted to a modulating device 80. In this example, the modulating device 80 comprises an electro-hydraulic valve having a movable plunger 81. The valve 80 is mounted in the fluid supply circuit 22 for the chamber 21, in such a way that the plunger 81 covers to a greater or less extent an orifice which communicates with the supply circuit 22, thus in turn varying the pressure at the pump S and in the chamber 21. It also brings the supply circuit 22 into communication with a lubricating and/or cooling circuit 82.

Ports 82 and 84, FIG. 1, are formed in the clutch casing 12 for the lubricating circuit and the fluid supply circuit respectively. Also shown in FIG. 1 are the ducts 85 formed in the hub portion 23 to bring the port 84 into communication with the chamber 21. By these means, the monitoring unit 70 is able to adjust the control pressure exerted by the control means elements 19 and 21 on the piston 20.

It will be noted that the monitoring unit 70, for example in the case of a four wheel drive ("4×4") vehicle, may be supplied with a signal at the onset of braking, so as to act on the modulating device 80 and so reduce the pressure in the chamber 21.

In the modified embodiment shown in FIG. 3, the spacing means of the cam mechanism are in the form of inclined teeth 101, carried by the part 51 and engaging in complementary recesses 102 of the part 52. Any torque difference between the shaft 32 and the clutch shaft 16 results in a tendency to relative displacement of one of the parts 51, 52 with respect to the other, this tendency being resisted by the housing 100 and resulting in a force being exerted on the detector 60.

In FIG. 4, the spacing means comprise a plurality of tangential tongues 103, which are inclined with respect to the common longitudinal axis of the shafts 16 and 32. In this example these tongues are bent, and are riveted at one end to the part 51 and at the other end to the part 52.

Figure 5:
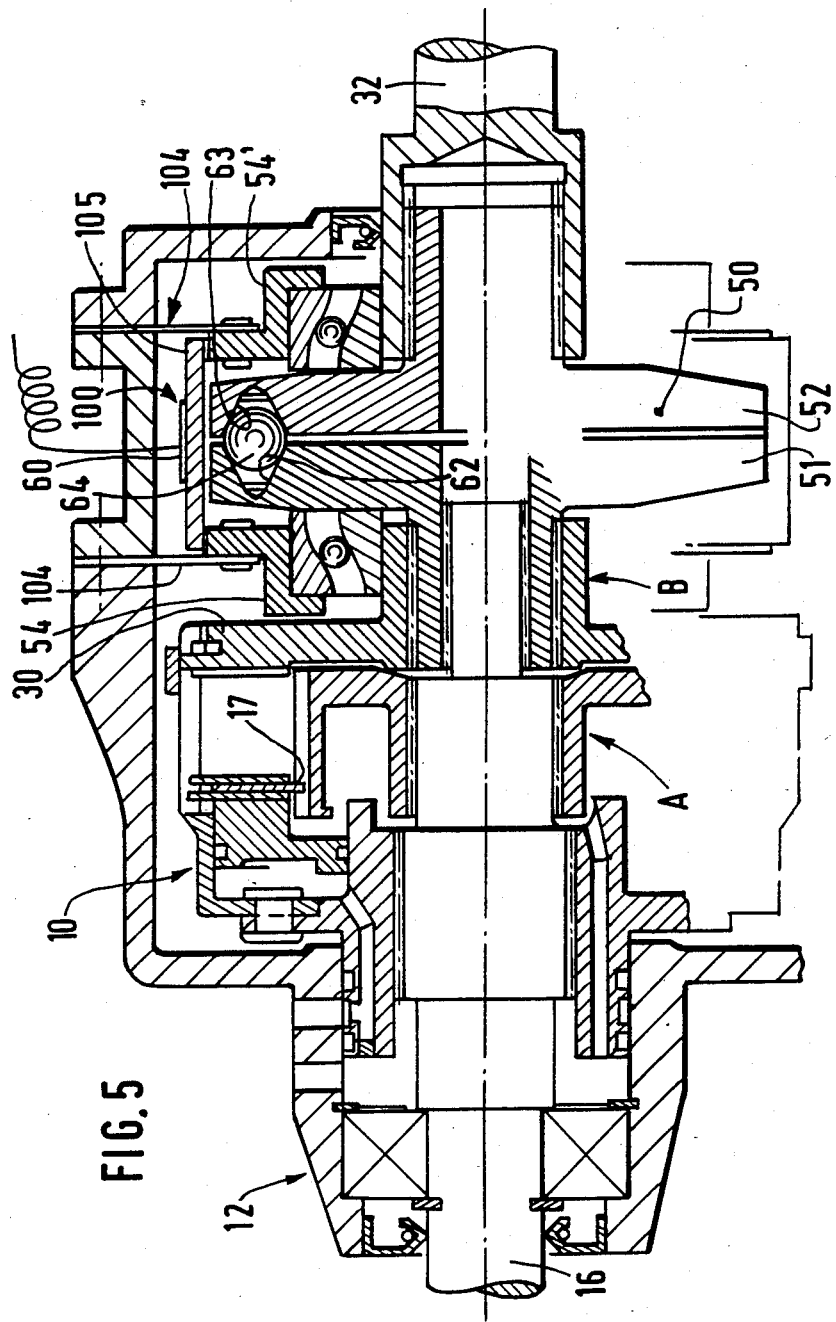

In FIG. 5, the housing 100 is suspended within the clutch casing 12 in a manner allowing axial resilience. In this example the suspension takes the form of either a single tangential tongue 104 or a plurality of tangential tongues 104; but in a modification it could consist of resilient discs. The housing 100 in FIG. 5 is delimited by the retaining members 54, 54', and by a sleeve 105 which extends axially between the outwardly directed radial portions of the members 54 and 54'. The detector 60 is mounted on the sleeve 105. It should be noted that the sleeve 105 can be secured to the members 54 and 54' by means of threaded fasteners.

Any tendency to separation of the parts 51 and 52 of the torque limiter gives rise to a tensile force in the sleeve 105, which is detected by the detector 60. It will be appreciated that, in this arrangement, parasitic longitudinal forces, originating particularly from the shafts 16 and 32, are minimised.

Figure 6:
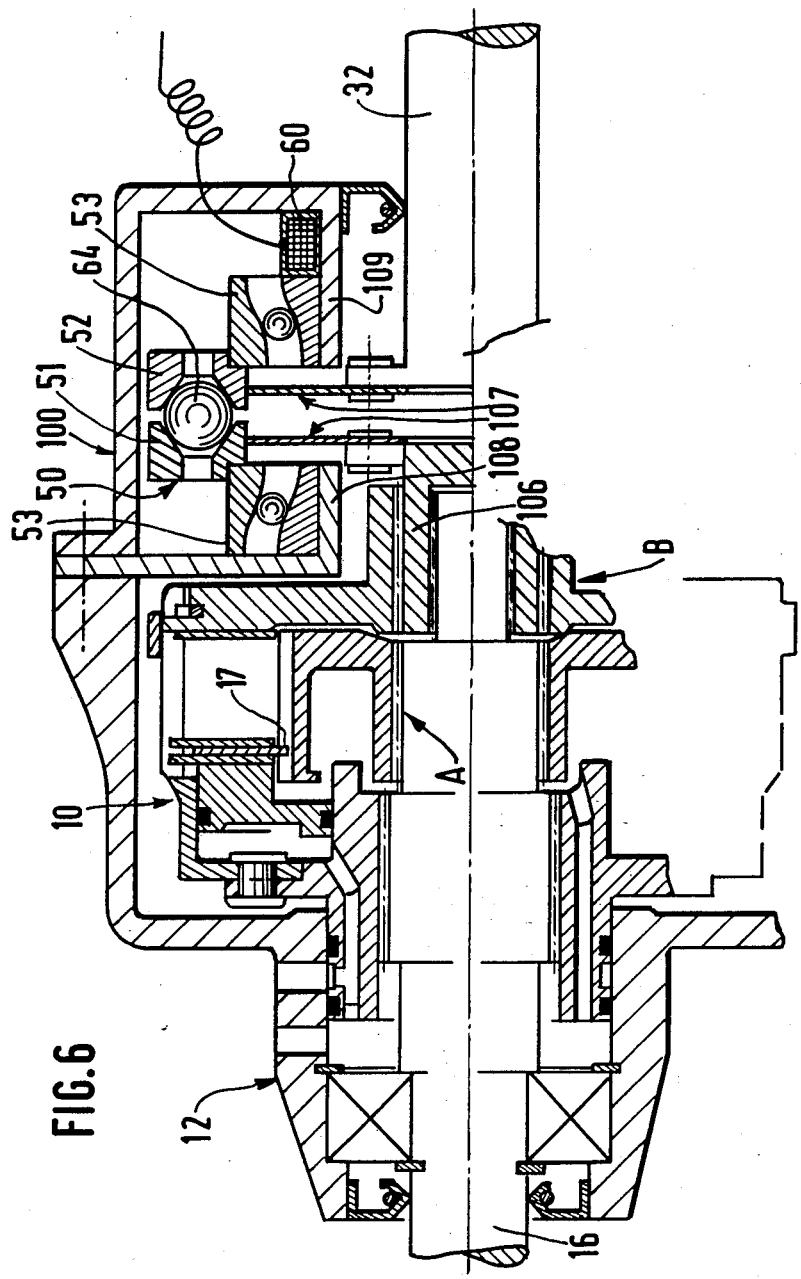

In the further modification shown in FIG. 6, the parts 51 and 52 of the cam mechanism are connected respectively to the output shaft 32 and to a half-shaft 106, which is coupled to the reaction plate 30 for rotation therewith, by means of axially resilient discs 107.

The rolling bearings 53 and 53' are respectively centred by an axial sleeve portion 108 of the plate 55, and by a similar sleeve portion 109 of the cover portion 59 of the torque limiter housing 100. The detector 60 is interposed between the bearing 53' and the base 58 of the cover 59, and is centred by the sleeve portion 109. This arrangement leads to a reduction in parasitic forces due to longitudinal displacements of the input shaft 16 and output shaft 32. It will also be noted that the spacing means of the cam mechanism are otherwise generally similar to those shown in FIGS. 1 and 2.

Figure 7:
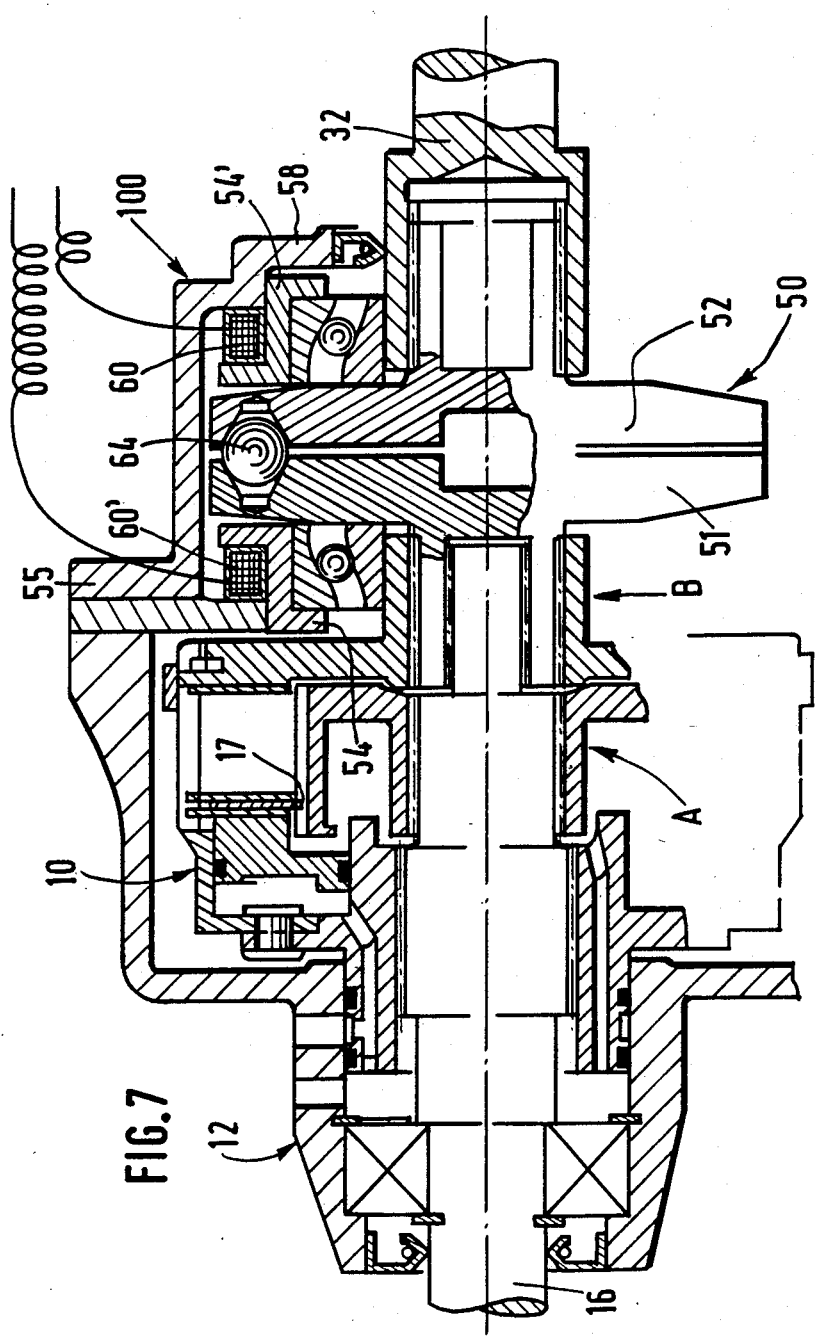

In order to obtain an even greater reduction in the above mentioned parasitic forces, a further detector 60' may be interposed between the shoulder of the member 54 and the plate 55. This is shown in FIG. 7. The monitoring unit 70 takes the mean value of the signals from the two detectors 60 and 60', which allows the effect of longitudinal parasitic forces to be ignored. It should be noted that the member 54 is slidingly mounted within the central opening of the plate 55.

Figure 9:
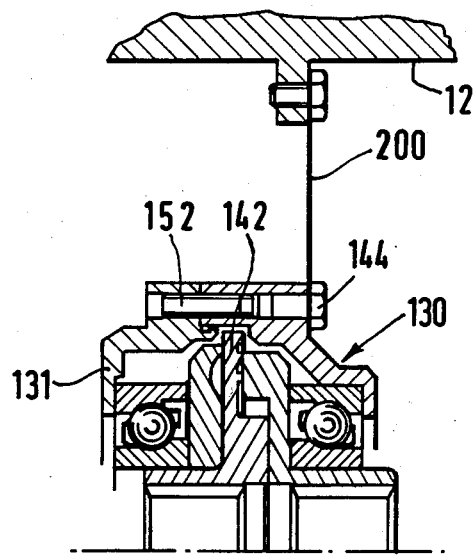
FIG. 9 shows how the housing of FIG. 8 is secured to a fixed support comprising the clutch casing.
Figure 8:
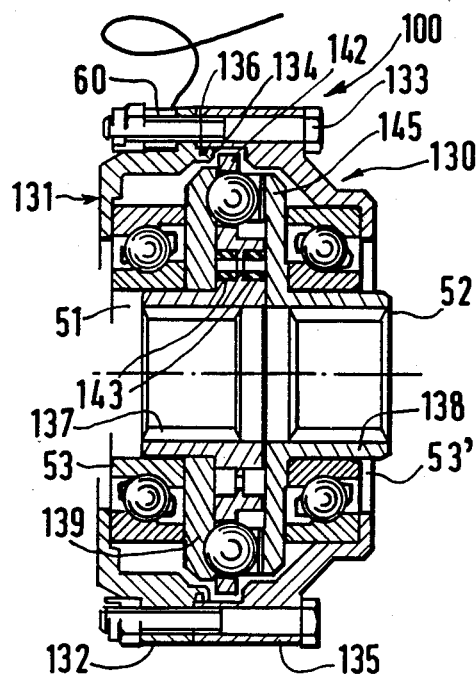
FIG. 8 is a view in axial cross section showing the mounting of the cam mechanism in its housing, in yet another embodiment of the invention.
Figure 10:
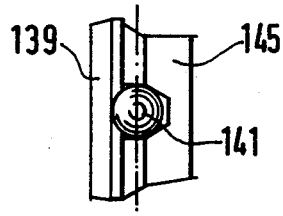
FIG. 10 is a view, seen in a generally circumferential direction, showing ball seatings and balls of the torque limiter of FIGS. 8 and 9.

In the embodiments shown in FIGS. 8 to 10, the cam mechanism housing 100 is secured to the fixed support (clutch casing) 12 by means of a resilient tongue 200. In order to obtain an assembly which is easy to handle and to transport, this housing comprises two annular members 130 and 131, connected together. In this example they are connected together by means of three bolts 133, spaced apart at equal intervals and extending through peripheral, radial flanges 132 and 135 respectively of the members 131 and 130. The housing member 131 is nested with a radial clearance in the member 130. To this end, the flange 132 is extended by an axial portion 134 which penetrates, with a clearance, into the interior of the flange 135. The axial portion 134 carries a toroidal rubber ring 136 for contact with the flange 135. In association with one of the bolts 133, the flange 132 is of reduced thickness so as to accommodate a strain gauge 60 between the flange 132 and the shank of the bolt 133 (FIG. 8). The strain gauge 60 is in the form of a sleeve through which the bolt 133 extends.

A slight axial clearance is preferably provided between the two flanges 132 and 135, for insertion of the strain gauge carried by the housing 100 and to provide a datum for the initial electrical signal given by the strain gauge.

One particular bolt 144, FIG. 9, serves to secure the tongue 200 to the housing 100, while another bolt is provided for securing its other end to the clutch casing 12.

A pin 152 is fitted for the purpose of transmitting the torque necessary for rotation of the bearings 53 and 53'. The pin 152 is either a force fit in the flange 132, and a sliding fit in the flange 135, or vice versa. This arrangement prevents the mechanical signal to the strain gauge 60 from being distorted by tangential movement of the bolts 133.

The bearings 53 and 53' are interposed directly between the radial edge of the members 130 and 131 and the parts 51 and 52 of the torque limiter. The part 51 has a hub portion 137 having a splined bore for coupling it in common rotation with a driving or driven shaft which carries a thrust plate 139. The thrust plate 139 is formed with a circumferentially extending groove, which has either a toroidal cross section or a flat base surface. Spherical balls 141 are housed in this groove.

The part 52 has seatings for the balls 141, facing towards the corresponding groove, just described, in the part 51 (see FIG. 10). The hub portion 137 is integral with a transverse, annular ball carrier 142. The part 52 has a hub portion 138 which is integral with a transversely extending plate 145 in which the recesses for the balls 141 are formed.

The ball carrier 142 has rubber springs 143, in contact respectively with the plates 139 and 145, mounted in housings formed in its base portion. In this example, the ball carrier 142, integral with the hub portion 137 (FIG. 9), is axially interposed with a clearance between the plates 139 and 145, with the springs 143 in direct contact with these plates. Due to the springs 143, longitudinal movements of the driving and driven shafts have little influence on the strain gauge 60, while the resilient tongue 200 also enables measurement by the strain gauge to be performed accurately while allowing axial movements to take place. The seal 136 also assists accuracy while allowing small radial movements to take place. When the cam mechanism 50 expands, the strain gauge 60 is compressed by the housing 100, and transmits an appropriate signal to the monitoring unit. Longitudinally acting forces are thus measured.

Figure 11:
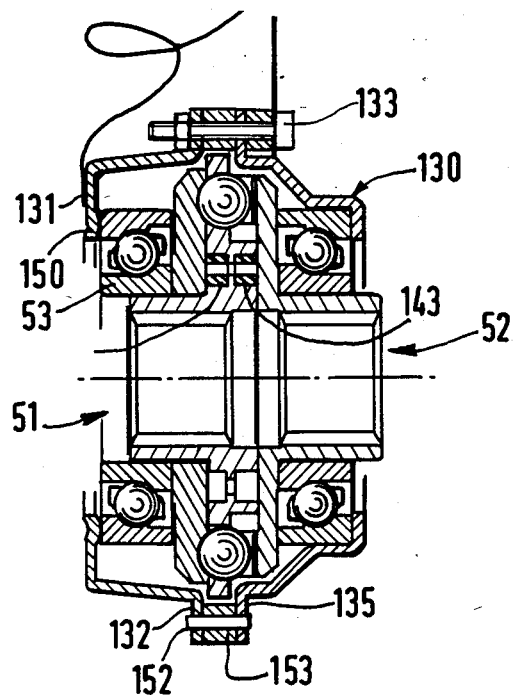
FIG. 11 is a view similar to FIG. 10, but showing yet a further embodiment of the invention.

Whereas in FIG. 8 the housing members 130 and 131 are inherently rigid, in the embodiment shown in FIG. 11 they are made of sheet material, with the member 131 providing a toroidal seating for the bearing 53. The strain gauge 60 is secured adhesively to the member 131 and is sensitive to any longitudinal deformations of the latter.

In order to prevent damage to the strain gauge 60, a cotter pin 152 is arranged to slide in the flanges 132 and 135. The pin 152 is a force fit in a spacer 153 inserted between the flanges 132 and 135. In this case, the bolts 133 serve only for securing purposes, also fixing the tongue in position. The other components are identical with those shown in FIG. 8.

In all cases, the housing and the cam mechanism 50 shown in FIGS. 8 to 11 may be used in place of those shown in FIGS. 1 to 7.

It will be clear from the foregoing description and from the drawings that one of the shafts may be divided into two half shafts, so that the cam mechanism can be inserted in any suitable position whatever, the cam mechanism being coupled with one of the two parts A and B of the clutch for rotation therewith.

The output shaft 32 may be a power take off shaft on an agricultural tractor or the auxiliary axle of a four wheel drive vehicle. In such cases, the facility for pressure variation enables a high degree of stability to be obtained in the transmitted torque. The axial extensions 51' and 52' may of course be part of the torque limiter parts 51 and 52. Similarly, a separate circuit may be provided for lubrication purposes. In this case, the electro-hydraulic valve may be of the duplex type. In this case an electric pump may be used in the pressure circuit and for control of the latter, with the pump then acting as the modulating means.

In place of ball bearings of the oblique contact type, other kinds of bearings capable of withstanding the longitudinal forces involved may be employed.

The clutch part B may be connected with the driving shaft and the part A with the driven shaft, while in certain applications the multi disc clutch may be reversed. In that case, the input shaft 16 is coupled with the cylinder or hollow member 19 for rotation therewith, while the hub portion 14, carrying the friction disc or discs 17, is then coupled with the output shaft 32, again for rotation with it. In such an embodiment, the hub portion 14 may be extended axially so as to extend through the reaction plate 30 and carry the bearing 53. The cam mechanism may then be coupled for rotation with the hub portion 14 and thus with the friction disc or discs 17.

It is of course also possible to reverse the various structures, and (as disclosed in the West German published patent document No. 1,600,183), the cylinder 19 may be movable and may constitute the pressure plate itself, being carried by a fixed member of L-shaped cross section. In this case, the hub portion 23 is connected to the hub portion 14 which carries the reaction plate 30, while the skirt portion 26 is cut, and carries the friction plate or plates 17.

Figure 12:
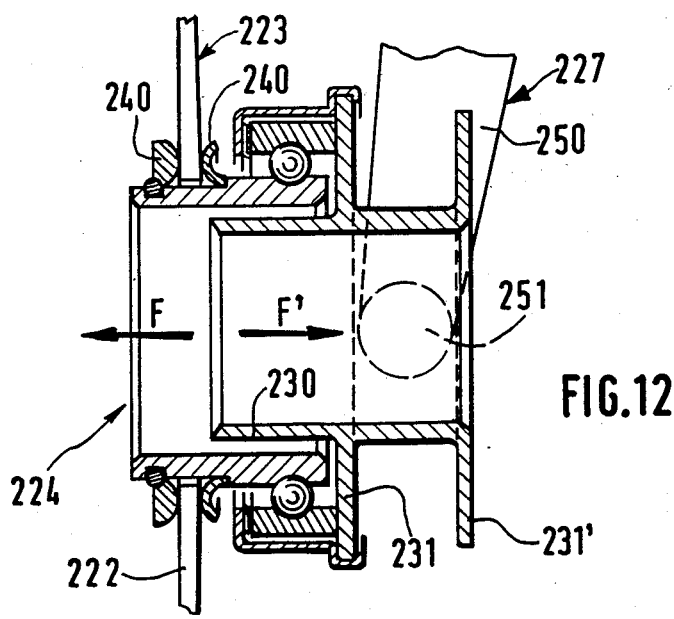
FIG. 12 is a view in axial cross section illustrating the application of the invention to a diaphragm clutch identical to that shown in FIG. 2 of French published patent application No. 2,616,501.
Figure 13:
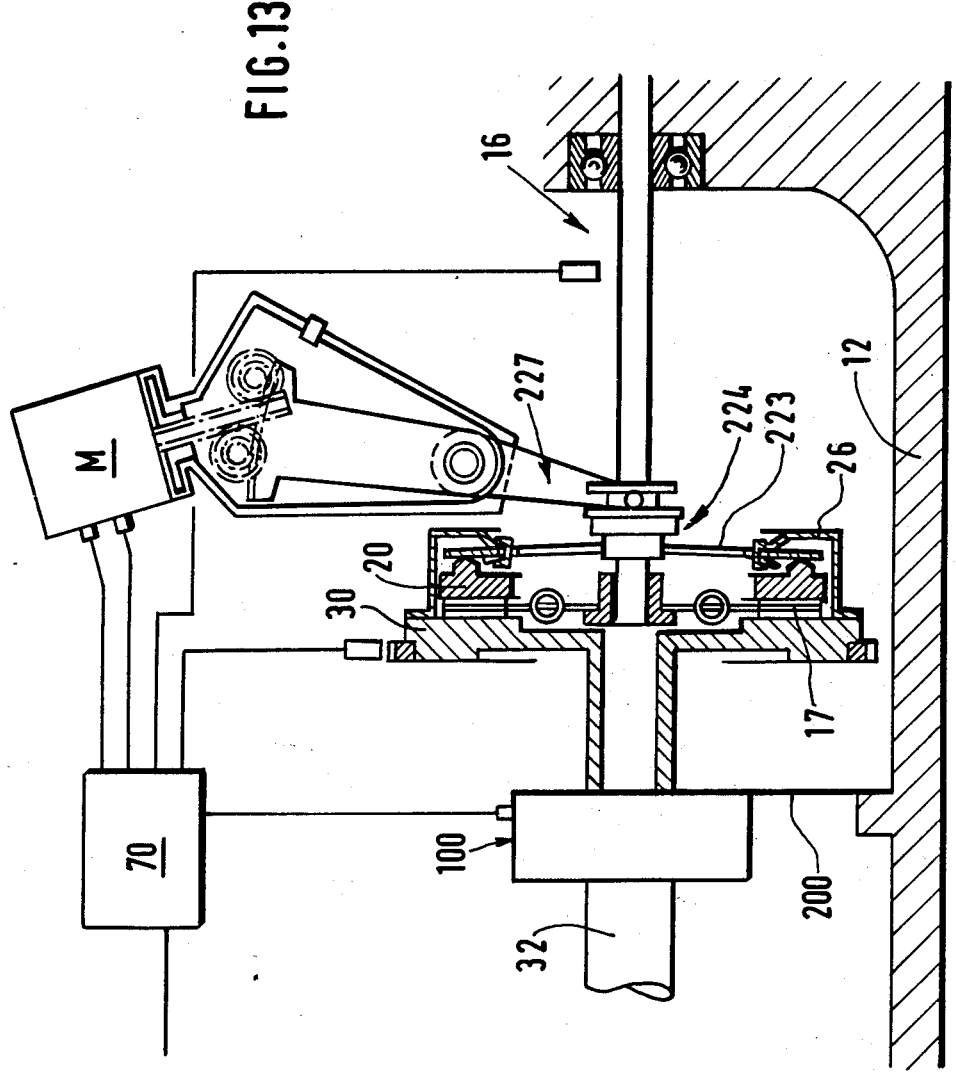
FIG. 13 is a view similar to FIG. 1 in axial cross section, showing another embodiment of the invention.

The control means may include a resilient member in the form of a diaphragm. Reference is now made to FIGS. 12 and 13 which are examples of such an arrangement. The diaphragm, 223, acts on a pressure plate 20, and also, at its inner periphery, on a declutching member 224. As described in French published patent application No. 2,616,501, the control means for the declutching member 224, which is of the double acting kind, comprise actuating means 227 which are such as to act on the member 224 in response to the monitoring means, which here comprise the cam mechanism 50 and its casing 100 responsive to the torque transmitted by the clutch. The actuating means 227 include a fork having two symmetrical fingers, one of which is shown at 250, the fingers being engaged on a trunnion 230 of a declutching member. Each finger 250 has a boss portion 251 acting on radial plate portions 231 and 231'.

The declutching member 224 has a ball bearing, and two force applying members 240 and 240', carried by the inner ring of the ball bearing and turned towards each other so as to trap between them a set of fingers 222 of the diaphragm 223. The fork 227 is actuated by an electric motor M through a transmission, which may for example be of the kind described in French published patent application No. 2,523,743, so as to obtain pivoting movement of the member 224.

The invention enables the cam mechanism with its casing, mounted for example on the input shaft of the vehicle gearbox, to transmit a signal from the strain gauge to a computer constituting the monitoring unit for the clutch, so as to control the electric motor and displace the declutching member in the direction indicated at F or F' in FIG. 12, and to cause the load on the diaphragm to be varied, with consequent variation in the control pressure exerted by the pressure plate against the friction disc. For further details, reference is made to the above mentioned French published patent application.

Finally, the fixed support, which in the above examples is the clutch casing, may consist of the gearbox casing.

What is claimed is:

1. A clutch, particularly for an automotive vehicle, of the kind generally comprising a first clutch part coupled with a first shaft for rotation therewith and a second clutch part coupled with a second shaft for rotation therewith, an annular friction disc or a plurality of annular friction discs spaced apart axially, said friction disc or discs being mounted around said first clutch part, said second clutch part comprising a pressure plate and a reaction plate for axially gripping said friction disc or discs between them, control means associated with said pressure plate and adapted to act upon said pressure plate to urge it towards the reaction plate, said clutch further comprising a cam mechanism adapted for variable expansion in response to variation in the transmitted torque, said cam mechanism comprising two parts defining a gap between them, spacing means coupling said cam mechanism parts to each other, said cam mechanism being coupled to one of said first and second shafts for rotation therewith, said clutch being further characterised by a cam mechanism housing disposed outside the space defined between said pressure plate and said reaction plate, means coupling said cam mechanism to one of said clutch parts for rotation therewith, and means mounting said cam mechanism housing to said fixed support means, said housing carring a detector for detecting longitudinally acting forces associated with said cam mechanism, and a monitoring unit to which said detector is connected, for monitoring control pressure exerted by said control means on said pressure plate.

2. A clutch according to claim 1, wherein said cam mechanism housing is suspended resiliently from a fixed casing.

3. A clutch according to claim 1, including at least one supporting tongue member, and said cam mechanism housing is secured to said fixed support means by said tongue member or members, said housing comprising two members; and a strain gauge carried by said housing, each said cam mechanism part having a hub portion; and a bearing interposed between each of said housing members and a respective said hub portion.

4. A clutch according to claim 3, wherein said cam mechanism comprises a plurality of balls, a hub portion, and a ball carrier which is fixed with respect to the hub portion, with each said torque limiter part including a radial plate member formed with recesses for reception of said balls, said ball carrier being interposed axially, with a clearance, between said plate members and having spring means for contact with the latter.

5. A clutch according to claim 1, including detector means for detecting longitudinally acting forces exerted by each said part of said cam mechanism.

6. A clutch according to claim 1, wherein said control means includes a cylinder member and a postion member cooperating with the cylinder member to define between them a variable volume pressure chamber, a hydraulic supply circuit, means connecting the interior of the cylinder member in the hydraulic supply circuit so that said pressure chamber is part of said circuit, one of said piston member and cylinder member being movable with respect to the other, the movable one of said members constituting the pressure plate of the clutch, the clutch being further characterised by modulating means arranged to be part of said supply circuit for the pressure chamber, and means connecting the detector with the monitoring unit whereby to cause the pressure in said chamber to be varied.

7. A clutch according to claim 1, including computer means, the clutch includes a double acting declutching member, the control means comprises a diaphragm mounted on the declutching member, the clutch further comprises means connecting the detector means for detecting longitudinal force with the computer means so that the detector controls the computer means, whereby to cause the declutching member to be displaced in one direction or the opposite direction selectively and to modify the load exerted by the diaphragm.

* * * * *